US010497922B2

(12) United States Patent
Sawanishi et al.

(10) Patent No.: US 10,497,922 B2
(45) Date of Patent: Dec. 3, 2019

(54) POUCH BATTERY AND ASSEMBLED BATTERY

(71) Applicant: ELIIY Power Co., Ltd., Tokyo (JP)

(72) Inventors: Keisuke Sawanishi, Tokyo (JP); Hideyuki Sugiyama, Tokyo (JP)

(73) Assignee: ELIIY POWER CO., LTD., Tokyo (JP)

(*) Notice: Subject to any disclaimer, the term of this patent is extended or adjusted under 35 U.S.C. 154(b) by 167 days.

(21) Appl. No.: 15/563,279

(22) PCT Filed: Mar. 30, 2015

(86) PCT No.: PCT/JP2015/059955
§ 371 (c)(1),
(2) Date: Sep. 29, 2017

(87) PCT Pub. No.: WO2016/157370
PCT Pub. Date: Oct. 6, 2016

(65) Prior Publication Data
US 2018/0090737 A1    Mar. 29, 2018

(51) Int. Cl.
*H01M 2/26* (2006.01)
*H01M 2/06* (2006.01)
(Continued)

(52) U.S. Cl.
CPC .............. *H01M 2/26* (2013.01); *H01M 2/06* (2013.01); *H01M 2/1077* (2013.01); *H01M 2/1673* (2013.01); *H01M 2/30* (2013.01)

(58) Field of Classification Search
CPC .... H01M 2/26; H01M 2/1061; H01M 2/0245; H01M 2/021; H01M 2/266;
(Continued)

(56) References Cited

U.S. PATENT DOCUMENTS

2011/0206976 A1*  8/2011  Yoo ..................... H01M 2/1061
                                                        429/153

FOREIGN PATENT DOCUMENTS

DE     10 2012 212937 A1    9/2013
JP        2000-353499 A    12/2000
(Continued)

OTHER PUBLICATIONS

European Patent Office, Extended European Search Report issued in corresponding Application No. EP 15 88 7523, dated Sep. 14, 2018.

*Primary Examiner* — Gary D Harris
(74) *Attorney, Agent, or Firm* — Stites & Harbison, PLLC; Jeffrey A. Haeberlin (57) ABSTRACT

A sealed battery of the present invention includes a power generation element including an electrode sheet and a separator; a laminate film disposed in such a way as to enclose the power generation element therein; an electrode connection terminal connected to the electrode sheet; and an electrolyte. The laminate film is shaped to form a housing section for power generation element, the housing section being hermetically sealed at a fusion bonding section where parts of the laminate film are overlapped and fusion-bonded and at a first sealing section where the electrode connection terminal is sandwiched between and fusion-bonded with parts of the laminate film. The power generation element and the electrolyte are housed in the housing section for power generation element. The electrode connection terminal comprises an external connection section for connecting with external and a conductive section disposed between the external connection section and the first sealing section. The conductive section is covered with the laminate film without bonding.

20 Claims, 6 Drawing Sheets

(51) Int. Cl.
*H01M 2/30* (2006.01)
*H01M 2/10* (2006.01)
*H01M 2/16* (2006.01)

(58) Field of Classification Search
CPC ............. H01M 2/0217; H01M 2/0212; H01M 2/1077; H01M 2/1673; H01M 2/30; H01M 2/20; H01M 2/06; H01M 10/0525; H01M 10/052; H01M 10/0585
USPC ............................................................ 429/7
See application file for complete search history.

(56) References Cited

FOREIGN PATENT DOCUMENTS

| | | |
|---|---|---|
| JP | 2012-074387 A | 4/2012 |
| JP | 2013-239293 A | 11/2013 |
| JP | 2014-135204 A | 7/2014 |
| KR | 2004-0107040 A | 12/2004 |

* cited by examiner

POUCH BATTERY AND ASSEMBLED BATTERY

TECHNICAL FIELD

The present invention relates to a sealed battery and an assembled battery.

BACKGROUND ART

In recent years, batteries have been used for various purposes; and batteries with a large capacity in particular are used for power supply for electric vehicles, electric power storage, and so forth.

In a case where a single battery cell is used, a voltage of the battery cell may be lower than a voltage required by an electric device. In such a case, it is necessary to connect two or more battery cells in series in order to increase the supply voltage to a desired voltage. In another case, a single battery cell may not supply as much electric energy as required by an electric device. In such a case, it is necessary to connect two or more battery cells in parallel in order to increase the supply electric energy to a desired quantity.

For this reason, a battery box or an assembled battery in which two or more battery cells are connected in series or in parallel is provided; and power is supplied to the electric devices from these batteries. Some batteries such as batteries for mobile bodies and batteries for power storage in particular are required to have a high voltage and capacity, and these batteries are also required to have an easy-to-handle structure in such a way that any of single battery cells in the assembled batteries is replaceable. Therefore, the assembled batteries that meet these requirements are desired.

There are some well-known ways of connecting two or more battery cells in series or in parallel such as using a bus bar(s) between external terminals (see, for example, PTL 1), and welding a bended electrode terminal (see, for example, PTL 2). It has been also known that battery cells whose electrode terminal is bended in a battery pack (see, for example, PTL 3).

CITATION LIST

Patent Literatures

PTL 1: Japanese Unexamined Patent Application Publication No. 2014-135204
PTL 2: Japanese Unexamined Patent Application Publication No. 2013-239293
PTL 3: Japanese Unexamined Patent Application Publication No. 2012-074387

SUMMARY OF INVENTION

Technical Problems

In the case where the two or more battery cells are connected by a bus bar(s), the assembled battery needs to have some space for the bus bar(s), which may interfere the downsizing of the assembled battery. In addition, there is a problem that it is necessary to insulate the bus bar(s), and an increase in the number of additional parts is unavoidable. In the case of the conventional assembled battery in which the two or more batteries are combined by bending the electrode terminal, it is necessary to provide a member for insulating the terminal portion between the batteries, leading to a complication of a manufacturing process of the assembled battery.

The present invention was devised in view of such circumstances, and provides a sealed battery that includes an external connection section of electrode terminal whose position can be accommodated, and the sealed battery is capable of preventing leak current at low cost.

Solution to Problems

The present invention provides a sealed battery comprising a power generation element including an electrode sheet and a separator; a laminate film disposed in such a way as to enclose the power generation element therein; an electrode connection terminal connected to the electrode sheet; and an electrolyte, wherein the laminate film is shaped to form a housing section for power generation element, the housing section being hermetically sealed at a fusion bonding section where parts of the laminate film are overlapped and fusion-bonded and at a first sealing section where the electrode connection terminal is sandwiched between and fusion-bonded with parts of the laminate film; the power generation element and the electrolyte are housed in the housing section for power generation element; the electrode connection terminal comprises an external connection section for connecting with external and a conductive section disposed between the external connection section and the first sealing section; and the conductive section is covered with the laminate film without bonding.

Advantageous Effects of Invention

The sealed battery of the present invention is provided with the power generation element including the electrode sheets and the separator; the laminate film disposed in such a way as to enclose the power generation element therein; and the electrolyte, wherein the laminate film is shaped to form a housing section for power generation element, the housing section being hermetically sealed at a fusion bonding section where parts of the laminate film are overlapped and fusion-bonded and at a first sealing section where the electrode connection terminal is sandwiched between and fusion-bonded with parts of the laminate film; the power generation element and the electrolyte are housed in the housing section for power generation element, so that the battery reactions can be stably caused in the power generation element.

The sealed battery of the present invention is provided with the electrode connection terminal connected to the electrode sheet; and the electrode connection terminal includes the external connection section; therefore, the sealed battery is capable of carrying out electric discharges and electric charges.

Since the electrode connection terminal has the conductive section disposed between the external connection section and the first sealing section, the electrode connection terminal may allow the conductive section to be bended and enables the position of the external connection section to be accommodated. This allows the position of the external connection section to be accommodated in accordance with a connection portion of an electric device, and also allows the position of the external connection section to be accommodated in accordance with a position of a connection portion of an assembled battery. This enables the production of a downsized assembled battery.

Since the conductive section is covered with the laminate film without bonding, the conductive section can be insulated with the laminate film, leading to the prevention of leak current to flow. The conductive section is covered with the same laminate film as the housing section for power generation element, so that the number of battery components can be reduced and the production cost of the battery can be reduced. Since the conductive section is covered with the laminate film without bonding, the conductive section can be easily bended, leading to an improvement in processability of the battery. A decrease in a sealing effect of the first sealing section can be prevented by bending at the conductive section.

DESCRIPTION OF EMBODIMENTS

A sealed battery of the present invention is characterized by comprising a power generation element including an electrode sheet and a separator; a laminate film disposed in such a way as to enclose the power generation element therein; an electrode connection terminal connected to the electrode sheet; and an electrolyte, wherein the laminate film is shaped to form a housing section for power generation element, the housing section being hermetically sealed at a fusion bonding section where parts of the laminate film are overlapped and fusion-bonded and at a first sealing section where the electrode connection terminal is sandwiched between and fusion-bonded with parts of the laminate film; the power generation element and the electrolyte are housed in the housing section for power generation element; the electrode connection terminal comprises an external connection section for connecting with external and a conductive section disposed between the external connection section and the first sealing section; and the conductive section is covered with the laminate film without bonding.

It is preferable for the sealed battery of the present invention that the laminate film is shaped to form a housing section for conductive section, the housing section being hermetically sealed at the fusion bonding section, the first sealing section, and a second sealing section where the electrode connection terminal is sandwiched between and bonded with parts of the laminate film; the second sealing section is disposed between the conductive section and the external connection section; and the conductive section is housed in the housing section for conductive section.

Such a structure can prevent the conductive section to be exposed, leading to an improvement in safety of the sealed battery. Even if a sealing effect of the first sealing sections degrades, this structure can prevent leakage of the electrolyte, leading to the improvement in safety of the sealed battery.

It is preferable that the sealed battery of the present invention has the following features: the electrode sheets comprise a positive-electrode sheet and a negative-electrode sheet; the electrode connection terminals comprise a positive-electrode connection terminal to be connected to the positive-electrode sheet, and a negative-electrode connection terminal to be connected to the negative-electrode sheet; the first sealing sections comprise a first positive-electrode sealing section where the positive-electrode connection terminal is sandwiched between and fusion-bonded with parts of the laminate film, and a first negative-electrode sealing section where the negative-electrode connection terminal is sandwiched between and fusion-bonded with parts of the laminate film; the positive-electrode connection terminal comprises a positive-electrode external connection section for connecting with external, and a positive-electrode conductive section disposed between the positive-electrode external connection section and the first positive-electrode sealing section; the negative-electrode connection terminal comprises a negative-electrode external connection section for connecting with external, and a negative-electrode conductive section disposed between the negative-electrode external connection section and the first negative-electrode sealing section; and the positive-electrode conductive section or the negative-electrode conductive section is covered with the laminate film without bonding.

Such a structure can prevent leak current from the positive-electrode conductive section or the negative-electrode conductive section. Since the positive-electrode conductive section is not bonded to the laminate film, and the negative-electrode conductive section is not bonded to the laminate film, the positive-electrode conductive section or the negative-electrode conductive section can be easily bended. The bended positive-electrode conductive section or negative-electrode conductive section can prevent a decrease in the sealing effect of the first positive-electrode sealing section or the first negative-electrode sealing section.

It is preferable that the sealed battery of the present invention has the following features: the laminate film is shaped to form a housing section for positive-electrode conductive section, the housing section being hermetically sealed at the fusion bonding section, the first positive-electrode sealing section, and a second positive-electrode sealing section where the positive-electrode connection terminal is sandwiched between and bonded with parts of the laminate film, and to form a housing section for negative-electrode conductive section, the housing section being hermetically sealed at the fusion bonding section, the first negative-electrode sealing section, and a second negative-electrode sealing section where the negative-electrode connection terminal is sandwiched between and bonded with parts of the laminate film; the second positive-electrode sealing section is disposed between the positive-electrode conductive section and the positive-electrode external connection section; the second negative-electrode sealing section is disposed between the negative-electrode conductive section and the negative-electrode external connection section; the positive-electrode conductive section is housed in the housing section for positive-electrode conductive section; and the negative-electrode conductive section is housed in the housing section for negative-electrode conductive section.

Such a structure can prevent the positive-electrode conductive section or the negative-electrode conductive section to be exposed, leading to an improvement in safety of the sealed battery. Even if the sealing effect of the first positive-electrode sealing section or the first negative-electrode sealing section degrades, this structure can prevent leakage of the electrolyte, leading to the improvement in safety of the sealed battery.

It is preferable that the sealed battery of the present invention has a structure such that the housing section for power generation element is interposed between the housing section for positive-electrode conductive section and the housing section for negative-electrode conductive section.

Such a structure can allow the positive-electrode conductive section or the negative-electrode conductive section to easily have a bended portion, leading to an improvement in processability of the battery.

It is preferable that the sealed battery of the present invention has the following features: the positive-electrode sheet comprises a positive-electrode current collector sheet to be connected to the positive-electrode connection terminal, and a positive-electrode active material layer disposed on the positive-electrode current collector sheet; the negative-electrode sheet comprises a negative-electrode current collector sheet to be connected to the negative-electrode connection terminal, and a negative-electrode active material layer disposed on the negative-electrode current collector sheet; the power generation element is configured to allow the positive-electrode current collector sheet to be foldable that is located between the positive-electrode connection terminal and an area where the positive-electrode active material layer, the negative-electrode active material layer, and the separator are overlapped one another; and the power generation element is configured to allow the negative-electrode current collector sheet to be foldable that is located between the negative-electrode connection terminal and an area where the positive-electrode active material layer, the negative-electrode active material layer, and the separator are overlapped one another.

Such a structure enables the position of the positive-electrode external connection section or the negative-electrode external connection section to be accommodated, leading to the production of a downsized assembled battery.

It is preferable that each of the positive-electrode connection terminal and the negative-electrode connection terminal is L-shaped in the sealed battery of the present invention.

Such a structure is capable of placing the positive-electrode external connection section or the negative-electrode external connection section at the side of the housing section for power generation element.

It is preferable that the positive-electrode conductive section and the negative-electrode conductive section each have a bended portion in the sealed battery of the present invention.

Such a structure enables the position of the positive-electrode external connection section or the negative-electrode external connection section to be accommodated, leading to the production of a downsized assembled battery.

The present invention also provides an assembled battery having the two or more sealed batteries of the present invention wherein the external connection section of the sealed battery is connected to the external connection section of the adjacent sealed battery.

The assembled battery of the present invention is configured to be downsized.

In the following, one embodiment of the present invention will be described through the use of drawings. Note that the following descriptions are exemplifications and are not to limit the present invention only to the drawings and the following descriptions.

Figure 1:
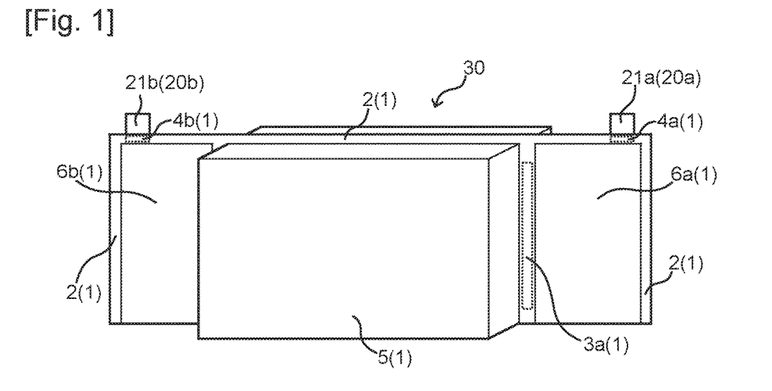
FIG. 1 illustrates a diagrammatic perspective view of a sealed battery in accordance with an embodiment of the present invention.
Figure 2:
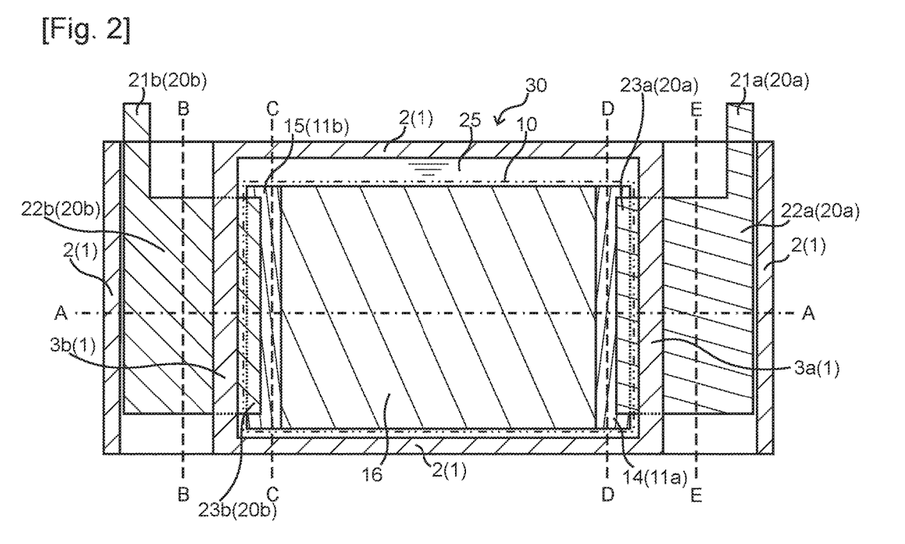
FIG. 2 illustrates a diagrammatic cross-section view of a sealed battery in accordance with an embodiment of the present invention.
Figure 3:
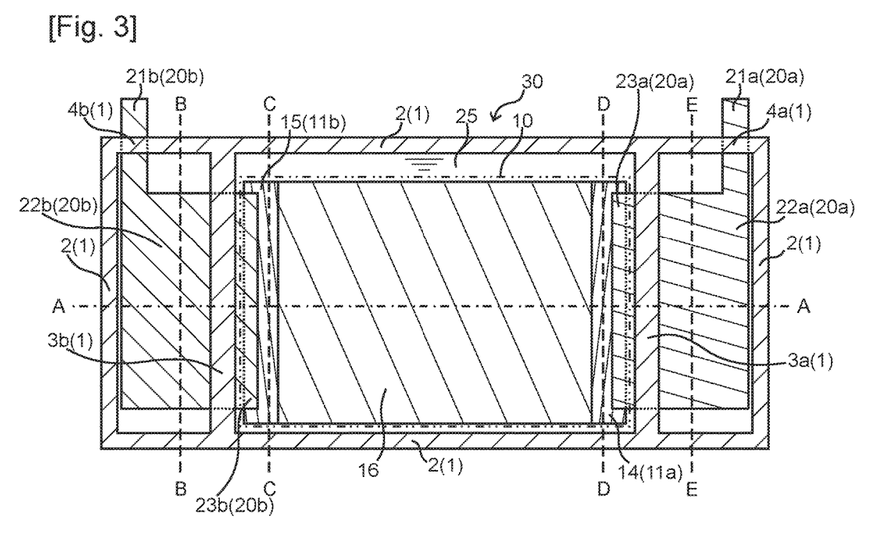
FIG. 3 illustrates a diagrammatic cross-section view of a sealed battery in accordance with an embodiment of the present invention.
Figure 4:
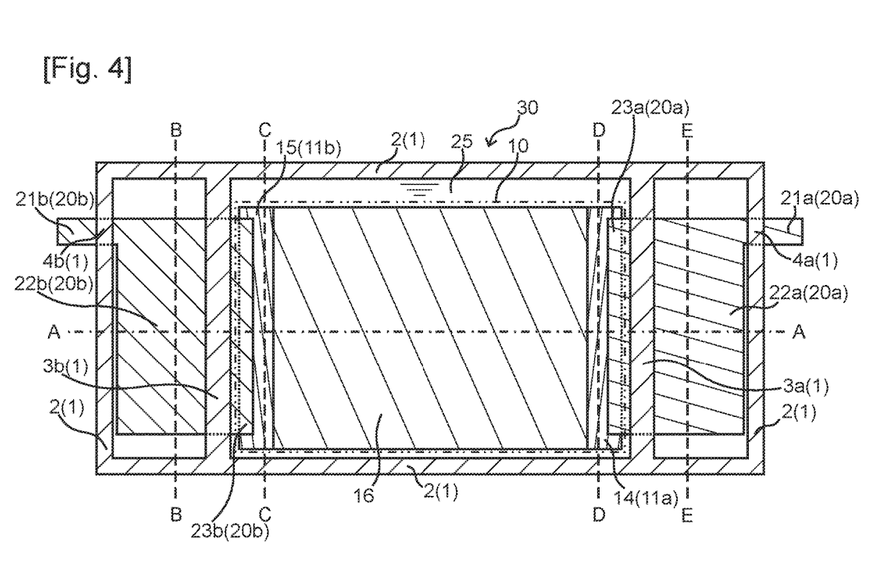
FIG. 4 illustrates a diagrammatic cross-section view of a sealed battery in accordance with an embodiment of the present invention.
Figure 5:
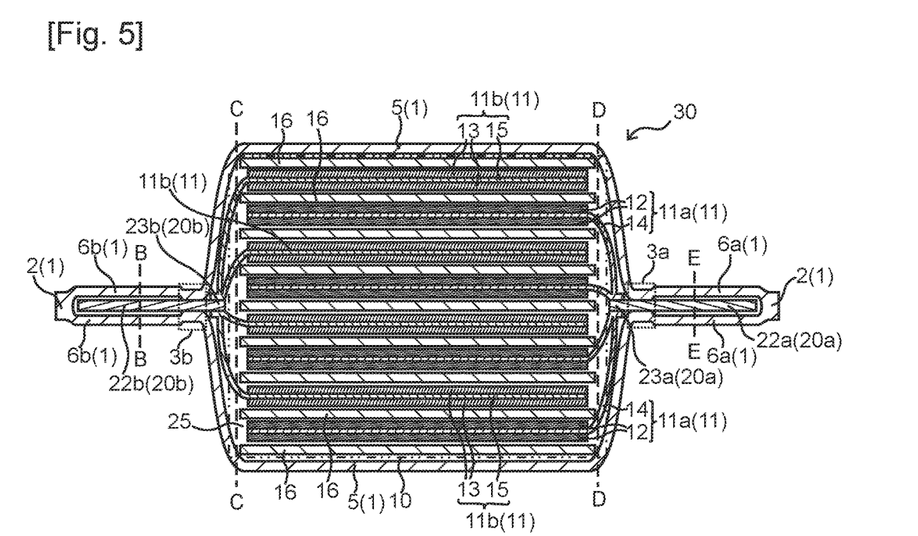
FIG. 5 illustrates a diagrammatic cross-section view of the sealed battery taken along the line A-A of FIG. 2 or FIG. 3.

FIG. 1 illustrates a diagrammatic perspective view of a sealed battery in accordance with the present embodiment. FIGS. 2 to 4 illustrate diagrammatic cross-section views of sealed batteries in accordance with the present embodiments, respectively. FIG. 5 illustrates a diagrammatic cross-section view of the sealed battery taken along the dashed-dotted line A-A of FIG. 2, 3 or 4.

A sealed battery 30 in accordance with the present embodiment is characterized by comprising a power generation element 10 including an electrode sheet 11 and a separator 16; a laminate film 1 disposed in such a way as to enclose the power generation element 10 therein; an electrode connection terminal 20 connected to the electrode sheet 11; and an electrolyte 25, wherein the laminate film 1 is shaped to form a housing section 5 for power generation element, the housing section 5 being hermetically sealed at a fusion bonding section 2 where parts of the laminate film 1 are overlapped and fusion-bonded and at a first sealing section 3 where the electrode connection terminal 20 is sandwiched between and fusion-bonded with parts of the laminate film 1; the power generation element 10 and the electrolyte 25 are housed in the housing section 5 for power generation element; the electrode connection terminal 20 comprises an external connection section 21 for connecting with external and a conductive section 22 disposed between the external connection section 21 and the first sealing section 3; and the conductive section 22 is covered with the laminate film 1 without bonding.

The sealed battery 30 in accordance with the present embodiment is a pouch battery cell. Examples of the sealed battery 30 include lithium-ion batteries, nickel-hydrogen batteries, and nickel-cadmium batteries.

The laminate film 1 is formed of two or more laminated films and becomes an outer covering for the sealed battery 30.

The laminate film 1 is not particularly limited as long as the film can be used as the outer covering for the battery; and the film may be, for example, a film including a metallic film and resin films on the both sides of the metallic film.

The laminate film 1 may be, for example, 50 to 200 μm in thickness.

The fusion bonding section 2 is a section where parts of the laminate film 1 are overlapped and fusion-bonded. The fusion bonding section 2 may be configured to form the housing section 5 for power generation element, or to form a housing section 6 for conductive section.

The first sealing sections 3 (a first positive-electrode sealing section 3a or a first negative-electrode sealing section 3b) and second sealing sections 4 (a second positive-electrode sealing section 4a or a second negative-electrode sealing section 4b) are sections where the electrode connection terminals 20 (a positive-electrode connection terminal 20a or a negative-electrode connection terminal 20b) is sandwiched between and fusion-bonded with parts of the laminate film 1. The first sealing sections 3 or the second sealing sections 4 may be, for example, about 1 cm in width.

The fusion bonding sections 2, the first sealing sections 3, and the second sealing sections 4 each may be formed by, for example, thermal fusion, ultrasonic fusion, oscillation fusion, or infrared fusion.

The fusion bonding section 2 may be formed by overlapping the laminate film 1 and fusion-bonding the parts of the laminate film, or may be formed by inserting a material such as a primer into the overlapped laminate film 1 and fusion-bonding the parts of the laminate film. The first sealing section 3 or the second sealing section 4 may be formed by bringing the laminate film 1 into contact with the electrode connection terminal 20 and fusion-bonding these two, or may be formed by interposing a material such as a primer between the electrode connection terminal 20 and the laminate film 1 and fusion-bonding these two.

The laminate film 1 is shaped to form a housing section 5 for power generation element, the housing section being hermetically sealed and housing the power generation element 10 and the electrolyte 25. The housing section 5 for power generation element may be provided by interposing the power generation element 10 between two laminate films 1 and forming the fusion bonding section 2, the first positive-electrode sealing section 3a, and the first negative-electrode sealing section 3b around the power generation element 10. The housing section 5 for power generation element may also be formed by folding one laminate film 1 in half and placing the power generation element 10 at a valley-fold area and then forming the fusion bonding section 2, the first positive-electrode sealing section 3a, and the first negative-electrode sealing section 3b around the power generation element 10.

The laminate film 1 covers a positive-electrode conductive section 22a or a negative-electrode conductive section 22b without bonding. This coverage is capable of preventing the positive-electrode conductive section 22a or the negative-electrode conductive section 22b from being exposed, and is capable of suppressing generation of leak current from the positive-electrode conductive section 22a or the negative-electrode conductive section 22b. The positive-electrode conductive section 22a or the negative-electrode conductive section 22b may be easily bended and is capable of improving processability of the battery.

The laminate film 1 may be configured to shape a housing section 6a for positive-electrode conductive section that houses the positive-electrode conductive section 22a of the positive-electrode connection terminal 20a. At the housing section 6a for positive-electrode conductive section, the laminate film 1 is not bonded to the positive-electrode conductive section 22a. The laminate film 1 may also be configured to shape a housing section 6b for negative-electrode conductive section that houses the negative-electrode conductive section 22b of the negative-electrode connection terminal 20b. At the housing section 6b for negative-electrode conductive section, the laminate film 1 is not bonded to the negative-electrode conductive section 22b.

As shown in the sealed batteries 30 illustrated in FIGS. 1 to 5, the housing section 6a for positive-electrode conductive section and the housing section 6b for negative-electrode conductive section may be formed in such a way that the housing section 5 for power generation element is positioned between the housing section 6a for positive-electrode conductive section and the housing section 6b for negative-electrode conductive section.

As shown in the sealed battery 30 illustrated in FIG. 2, the housing section 6a for positive-electrode conductive section or the housing section 6b for negative-electrode conductive section may have an opening at its upper portion or lower portion, or both. Alternatively, although not illustrated, both the upper portion and the lower portion are closed, while either or both of the housing sections may have an opening at its side portion.

As shown in the sealed batteries 30 illustrated in FIGS. 3 and 4, the housing section 6a for positive-electrode conductive section or the housing section 6b for negative-electrode conductive section may be hermetically sealed. The sealed housing section 6a for positive-electrode conductive section may be provided by forming the fusion bonding section 2, the first positive-electrode sealing section 3a, and the second positive-electrode sealing section 4a around the positive-electrode conductive section 22a. The second positive-electrode sealing section 4a is disposed between the positive-electrode conductive section 22a and a positive-electrode external connection section 21a.

The sealed housing section 6b for negative-electrode conductive section may be provided by forming the fusion bonding section 2, the first negative-electrode sealing section 3b, and the second negative-electrode sealing section 4b around the negative-electrode conductive section 22b. The second negative-electrode sealing section 4b is disposed between the negative-electrode conductive section 22b and a negative-electrode external connection section 21b.

Owing to the sealed housing section 6a for positive-electrode conductive section or the sealed housing section 6b for negative-electrode conductive section in such a way above, the sealed battery 30 may improve in safety. For example, even if the first positive-electrode sealing section 3a or the first negative-electrode sealing section 3b declines in sealing effect, and the electrolyte 25 leaks out, the leaking electrolyte 25 will stay in the housing section 6a for positive-electrode conductive section or the housing section 6b for negative-electrode conductive section, and will not leak out of the sealed battery 30. The electrolyte 25 thus can be prevented from leaking out, leading to the improvement in safety of the sealed battery 30.

The power generation element 10 includes the electrode sheets 11 (a positive-electrode sheet 11a or a negative-electrode sheet 11b) and the separator 16. The power generation element 10 is housed in the housing section 5 for power generation element. The battery reactions are caused by the power generation element together with the electrolyte 25. These battery reactions allow the sealed battery 30 to be charged or to discharge. The sealed battery 30 may have one power generation element 10 or may have two or more power generation elements 10. The positive-electrode sheet 11a and the negative-electrode sheet 11b may be the same or different in width. In the case where the positive-electrode sheet 11a and the negative-electrode sheet 11b are different in width, the power generation element 10 may be placed in such a way that an end of the electrode sheet 11 at least whose width is wider does not come in contact with the separator 16.

As shown in the sealed battery 30 illustrated in FIG. 5, the power generation element 10 is provided with the positive-electrode sheet 11a, the negative-electrode sheet 11b, and the separator 16 interposed between the positive-electrode sheet and the negative-electrode sheet. The power generation element 10 may be configured to have a stack structure in which the positive-electrode sheet 11a and the negative-electrode sheet 11b are stacked with the separator 16 between the sheets, or may be configure to have a winding structure in which the stacked positive-electrode sheet 11a and negative-electrode sheet 11b are wound with the separator 16 between the sheets.

For example, the power generation element 10 may be provided with one separator 16 in the form of an accordion fold, the positive-electrode sheets 11a, and the negative-electrode sheets 11b, the positive-electrode sheets 11a and the negative-electrode sheets 11b being respectively disposed in valley folds of the separator 16 and being disposed alternately with the separator 16 interposed between the positive-electrode sheet and the negative-electrode sheet.

The number of the positive-electrode sheets 11a or the negative-electrode sheets 11b in one power generation element 10 may be properly adjusted in accordance with a required capacity of the battery.

The separator 16 is in the form of a sheet and is interposed between the positive-electrode sheet 11a and the negative-electrode sheet 11b. The separator 16 is not particularly limited as long as the separator is capable of preventing from flowing a short-circuit current between the positive-electrode sheet 11a and the negative-electrode sheet 11b, and as long as the separator is capable of allowing the electrolyte to pass therethrough; and an example of the separator is a microporous film made of polyolefin.

The positive-electrode sheet 11a comprises a positive-electrode current collector sheet 14 and a positive-electrode active material layer 12 provided on the positive-electrode current collector sheet 14. The positive-electrode sheet 11a may be formed, for example, by forming the positive-electrode active material layer 12 respectively on the both sides of the rectangular positive-electrode current collector sheet 14. The positive-electrode active material layers 12 may be formed up to an end of the positive-electrode current collector sheet 14, or the end of the positive-electrode current collector sheet may be uncoated with the positive-electrode active material layer. The positive-electrode active material layers 12 on the both sides of the positive-electrode current collector sheet 14 may be the same or different in width. The positive-electrode sheet 11a may be configured to have a size of, for example, about 6 cm×about 12 cm.

The positive-electrode sheet 11a may include a terminal connection portion that is to connect with a positive-electrode connection section 23a of the positive-electrode connection terminal 20a, and this terminal connection portion may be formed at the end of the positive-electrode sheet 11a where the positive-electrode active material layers 12 are not formed on the both sides of the positive-electrode current collector sheet 14. Alternatively the terminal connection portion may be provided by having a convex lug portion projecting from one end of the positive-electrode current collector sheet 14, and the lug portion is free of the positive-electrode active material layer 12 therearound.

The positive-electrode current collector sheet 14 is not particularly limited as long as the positive-electrode current collector sheet has electric conductivity, and as long as the positive-electrode current collector sheet can be provided with the positive-electrode active material layer 12 on the surface of the positive-electrode current collector sheet; and an example of the positive-electrode current collector sheet is a metal foil. Preferably used as the metal foil is an aluminum foil. The positive-electrode current collector sheet 14 is, for example, 100 μm to 400 μm in thickness.

The positive-electrode active material layer 12 may be formed on the positive-electrode current collector sheet 14 by a coating method, etc. with use of a positive-electrode active material to which a conducting agent, a binding agent, etc. are added. Used as the positive-electrode active material is, for example, lithium-transition metal composite oxides capable of reversibly extracting and/or inserting lithium ions—e.g., $LiCoO_2$, $LiNiO_2$, $LiNi_xCo_{1-x}O_2$ (x=0.01 to 0.99), $LiMnO_2$, $LiMn_2O_4$, $LiCo_xMn_yNi_zO_2$ (x+y+z=1), and olivine-type $LiFePO_4$ and $Li_xFe_{1-y}M_yPO_4$ (wherein 0.05≤x≤1.2 and 0≤y≤0.8; and M is at least one of Mn, Cr, Co, Cu, Ni, V, Mo, Ti, Zn, Al, Ga, Mg, B, and Nb)—and these lithium-transition metal composite oxides may be used singly or as a mixture of two or more.

The negative-electrode sheet 11b comprises a negative-electrode current collector sheet 15 and a negative-electrode active material layer 13 provided on the negative-electrode current collector sheet 15. The negative-electrode sheet 11b may be formed, for example, by forming the negative-electrode active material layers 13 respectively on the both sides of the rectangular negative-electrode current collector sheet 15. The negative-electrode active material layer 13 may be formed up to an end of the negative-electrode current collector sheet 15, or the end of the negative-electrode current collector sheet 15 may be uncoated with the negative-electrode active material layer. The negative-electrode active material layers 13 on the both sides of the negative-electrode current collector sheet 15 may be the same or different in width. The negative-electrode sheet 11b may be configured to have a size of, for example, about 6 cm×about 12 cm.

The negative-electrode sheet 11b may have a terminal connection portion that is to connect with a negative-electrode connection section 23b of the negative-electrode connection terminal 20b, and this terminal connection portion may be formed at the end of the negative-electrode sheet 11b where the negative-electrode active material layers 13 are not formed on the both sides of the negative-electrode current collector sheet 15. Alternatively the terminal connection portion may be provided by having a lug portion at one end of the negative-electrode current collector sheet 15, and the lug portion is free of the negative-electrode active material layer 13 therearound.

The negative-electrode current collector sheet 15 is not particularly limited as long as the negative-electrode current collector sheet has electric conductivity, and as long as the negative-electrode current collector sheet can be provided with the negative-electrode active material layer 13 on the surface of the negative-electrode current collector sheet; and an example of the negative-electrode current collector sheet is a metal foil. Preferably used as the metal foil is a copper foil. The negative-electrode current collector sheet 15 is, for example, 100 μm to 400 μm in thickness.

The negative-electrode active material layer 13 may be formed on the negative-electrode current collector sheet 15 by a coating method, etc. with use of a negative-electrode active material to which a conducting agent, a binding agent, etc. are added. For example, used as the negative-electrode active material to be used in lithium-ion secondary batteries is graphite, partially graphitized carbon, hard carbon, soft carbon, $LiTiO_4$, an Sn alloy, etc.; and these materials may be used singly or as a mixture of two or more.

The power generation element 10 may be configured to make a part of the positive-electrode current collector sheet 14 foldable, the part being situated between the positive-electrode connection terminal 20a and a section where the positive-electrode active material layer 12, the negative-electrode active material layer 13, and the separator 16 are stacked one another. This part of the positive-electrode current collector sheet does not have the positive-electrode active material layer 12 therearound, and there is only the positive-electrode current collector sheet 14 itself; and even if the part of the positive-electrode current collector sheet is folded, there is no effect on battery performance. Moreover, this part may be folded without affecting mechanical characteristics and the like of the battery since this part does not directly connect with the positive-electrode connection terminal 20*a*. This enables the positive-electrode connection terminal 20*a* to be disposed variously, and enables the sealed battery 30 to be placed in a smaller space. As seen in FIGS. 2 to 5, the power generation element 10 may be bended, for example, along the dashed line D-D.

The power generation element 10 may be configured to make a part of the negative-electrode current collector sheet 15 foldable, the part being situated between the negative-electrode connection terminal 20*b* and a section where the positive-electrode active material layer 12, the negative-electrode active material layer 13, and the separator 16 are stacked one another. This part of the negative-electrode current collector sheet does not have the negative-electrode active material layer 13 therearound, and there is only the negative-electrode current collector sheet 15 itself; and even if the part of the negative-electrode current collector sheet is folded, there is no effect on battery performance. Moreover, this part may be folded without affecting mechanical characteristics and the like of the battery since this part does not directly connect with the negative-electrode connection terminal 20*b*. This enables the negative-electrode connection terminal 20*b* to be disposed variously, and enables the sealed battery 30 to be placed in a smaller space. As seen in FIGS. 2 to 5, the power generation element 10 may be bended, for example, along the dashed line C-C.

Examples of the electrolyte 25 include carbonates, lactones, ethers, esters, and the like to be used as a solvent; and these solvents may be used as a mixture of two or more. Among these solvents, a mixture of a cyclic carbonate and a linear carbonate is particularly preferable. The electrolyte 25 is a solution made by dissolving a lithium salt solute as an electrolyte—$LiCF_3SO_3$, $LiAsF_6$, $LiClO_4$, $LiBF_4$, $LiPF_6$, LiBOB, $LiN(CF_3SO_2)_2$, $LiN(C_2F_5SO_2)$, or the like—in an organic solvent. The electrolyte may be blended with, as required, one or more types of additives such as VC (vinylene carbonate), PS (propane sultone), VEC (vinyl ethylene carbonate), PRS (propene sultone), and a flame retardant.

The electrode connection terminal 20 (the positive-electrode connection terminal 20*a* or the negative-electrode connection terminal 20*b*) includes the electrode connection section 23 (the positive-electrode connection section 23*a* or the negative-electrode connection section 23*b*) to be connected to the electrode sheet 11 (the positive-electrode sheet 11*a* or the negative-electrode sheet 11*b*); the external connection section 21 (the positive-electrode external connection section 21*a* or the negative-electrode external connection section 21*b*) for connecting with external; and the conductive section 22 (the positive-electrode conductive section 22*a* or the negative-electrode conductive section 22*b*) disposed between the electrode connection section 23 and the external connection section 21. More specifically, the positive-electrode connection terminal 20*a* includes the positive-electrode connection section 23*a*, the positive-electrode external connection section 21*a*, and the positive-electrode conductive section 22*a*; and the negative-electrode connection terminal 20*b* includes the negative-electrode connection section 23*b*, the negative-electrode external connection section 21*b*, and the negative-electrode conductive section 22*b*.

The electrode connection terminal 20 may be a metal plate having a thickness of, for example, 100 μm to 500 μm. This metal plate may have been subjected to press-processing or may have been bended. For example, the positive-electrode connection terminal 20*a* may be an aluminum plate, and the negative-electrode connection terminal 20*b* may be a copper plate.

The electrode connection terminal 20 may be in the various forms, and may be, for example, square-shaped or L-shaped. The electrode connection terminal 20 itself may serve as the external connection section 21, or may be provided with an external connection section welded or some other way to the electrode connection terminal 20.

As shown in the sealed batteries illustrated in FIGS. 2 and 3, the L-shaped electrode connection terminals 20 each may be provided with the electrode connection section 23 at its one end and the external connection section 21 at its another end. Such a structure of the electrode connection terminal 20 may be capable of having the external connection section 21 provided at an upper part of a side of the sealed battery 30 in a case where a bended portion 26 is formed at the conductive section 22, and this enables the sealed battery 30 to be placed in a small space. The electrode connection section 23 and the conductive section 22 of the L-shaped electrode connection terminal 20 may be, for example, about 5 cm in width. The terminal connection portion of the electrode sheet 11 and the electrode connection section 23 may overlap one another by, for example, about 1 cm, and may be joined by ultrasonic welding.

As shown in the sealed battery 30 illustrated in FIG. 4, the external connection section 21 may be configured in such a way that the external connection section 21 can be disposed at a side of the sealed battery 30 in a case where the bended portion 26 is formed at the conductive section 22.

The first sealing section 3 (the first positive-electrode sealing section 3*a* or the first negative-electrode sealing section 3*b*) is disposed between the electrode connection section 23 (the positive-electrode connection section 23*a* or the negative-electrode connection section 23*b*) and the conductive section 22 (the positive-electrode conductive section 22*a* or the negative-electrode conductive section 22*b*). This allows the electrode connection section 23 to be placed inside the housing section 5 for power generation element, and allows the conductive section 22 and the external connection section 21 to be placed outside the housing section 5 for power generation element. This makes it possible for the electrode connection terminal 20 to allow an electric charge collected by the positive-electrode current collector sheet 14 or the negative-electrode current collector sheet 15 to flow into an external circuit, while the housing section 5 for power generation element is kept sealed; and the sealed battery 30 becomes capable of discharging or being charged.

The external connection section 21 (the positive-electrode external connection section 21*a* or the negative-electrode external connection section 21*b*) is where the sealed battery 30 comes in contact with another battery, an external wiring, a bus bar, a terminal of an electric device, or the like. The sealed battery 30 can be connected to an electric device or the like through this external connection section 21. To assemble one assembled battery 35 from two or more sealed batteries 30, external connection sections 21 of the two or more sealed batteries 30 may be connected in order to connect the sealed batteries 30 in series or in parallel.

The external connection section 21 may be disposed without being covered with the laminate film 1. This allows the external connection section 21 to easily connect with a terminal of an electric device, another external connection section of a battery, or the like.

The conductive section 22 (the positive-electrode conductive section 22a or the negative-electrode conductive section 22b) is disposed between the external connection section 21 (the positive-electrode external connection section 21a or the negative-electrode external connection section 21b) and the first sealing section 3 (the first positive-electrode sealing section 3a or the first negative-electrode sealing section 3b), and serves as a conductive route between the electrode connection section 23 and the external connection section 21. The conductive section 22 is configured to allow the external connection section 21 to be placed variably, and allows a position of the external connection section 21 to changeably coordinate with a position of a battery connection section of an electric device. The conductive section also allows two or more sealed batteries 30, which constitute an assembled battery 35, to easily connect to each other.

The conductive section 22 (the positive-electrode conductive section 22a or the negative-electrode conductive section 22b) is covered with the laminate film 1 without bonding. This allows the laminate film 1 to insulate the conductive section 22, and can suppress the flow of leak current. The laminate film can also protect the conductive section 22. The conductive section 22 covered with the laminate film 1 allows reduction of the number of components of the sealed battery 30, and this leads to reduction in production cost of the sealed battery. The conductive section 22 may be entirely covered with the laminate film 1 as shown in the sealed batteries 30 illustrated in FIGS. 2 to 4, or the conductive section 22 may be partially covered with the laminate film 1. Alternatively, only one side of the conductive section 22 may be covered with the laminate film 1.

The conductive section 22 (the positive-electrode conductive section 22a or the negative-electrode conductive section 22b) may be housed in the housing section 22 for conductive section (the housing section 22a for positive-electrode conductive section or the housing section 22b for negative-electrode conductive section) formed by the laminate film 1. In the housing section 22 for conductive section, the laminate film 1 is not bonded to the conductive section 22.

The conductive section 22 may be housed in the opened housing section 22 for conductive section as shown in the sealed battery 30 illustrated in FIG. 2, or may be housed in the sealed housing section 22 for conductive section as shown in the sealed batteries 30 illustrated in FIGS. 3 and 4. By housing the conductive section 22 in the housing section for conductive section 22, the conductive section 22 can be prevented from being exposed, leading to an improvement in safety of the sealed battery 30.

The conductive section 22 (the positive-electrode conductive section 22a or the negative-electrode conductive section 22b) may have the bended portion 26. The bended portion 26 of the positive-electrode conductive section 22a may be formed by subjecting the positive-electrode conductive section 22a to a bending process by being taken along, for example, the dashed line E-E of FIGS. 2 to 5. The bended portion 26 of the negative-electrode conductive section 22b may be formed by subjecting the negative-electrode conductive section 22b to a bending process by being taken along, for example, the dashed line B-B of FIGS. 2 to 5.

The formation of the bended portions 26 can change positions of the external connection sections 21. This may allow a position of the external connection section 21 to changeably coordinate with a position of a terminal of an electric device, or may allow a position of the external connection section 21 to changeably coordinate with a position of a connection portion 33 of the assembled battery 35. This enables the production of the downsized assembled battery 35. This also enables two or more sealed batteries 30 to be connected to each other without using bus bars.

Figure 6:
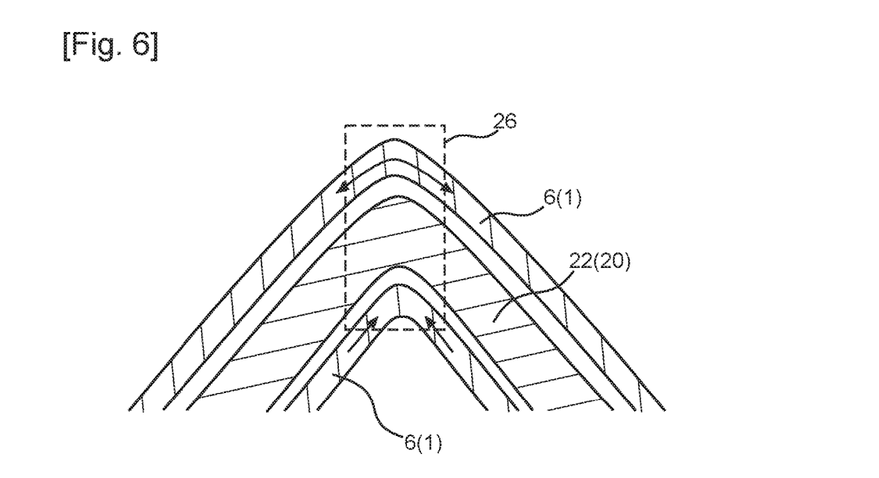
FIG. 6 illustrates a diagrammatic cross-section view of a bended portion in a sealed battery in accordance with an embodiment of the present invention.

FIG. 6 illustrates a diagrammatic cross-section view of the bended portion 26. At the bended portion 26, the conductive section 22 is bended; therefore, the laminate film 1 that constitutes the housing section 6 for conductive section is also folded. The laminate film 1 on the inside of the bended portion 26 is subjected to a compressive force, and the laminate film 1 on the outside of the bended portion 26 is subjected to a tensile force. At the bended portion 26, the conductive section 22 is not bonded to the laminate film 1; thus the laminate film 1 may slip from the conductive section 22, leading to the dispersion of the compressive force and the tensile force applied to the laminate film 1. This enables the bended portion 26 to have high processability. In addition, the formation of the bended portion 26 does not cause any undesirable effect on a sealing effect of the first sealing section 3.

For example, if the conductive section 22 is bonded to the laminate film 1 at the bended portion 26, the tensile force and the compressive force applied to the laminate film 1 would not be dispersed. This requires a powerful force to form the bended portion 26, leading to a decrease in processability. The formation of the bended portion 26 may cause the laminate film 1 to come off the conductive section 22. Once this peeling starts, the peeling is gradually spread, causing a decrease in a sealing effect of the first sealing section 3, and leakage of the electrolyte 25 from the first sealing section 3.

A battery bended at the first sealing section 3 (the first positive-electrode sealing section 3a or the first negative-electrode sealing section 3b) and a battery bended along the dashed line E-E of FIG. 2 were subjected to a heat cycle test (−40° C. to 75° C., 50 cycles); and the latter battery, which was bended along the dashed line E-E, was not found to have any leakage of the electrolyte, whereas the former battery, which was bended at the first sealing sections 3, was found to have some leakage of the electrolyte from the housing section 5 for power generation element.

It is thus found that the bonding between the conductive section 22 and the laminate film 1 at the bended portion 26 is likely to cause a decrease in a sealing effect of the sealed battery 30.

In the following, the sealed batteries 30 illustrated in FIGS. 1 to 3 and 5 will be described having the bended portions bended along the dashed lines B-B, C-C, D-D, and E-E. FIGS. 7(a) to 7(e) illustrate examples of bending patterns of the sealed batteries 30.

The sealed batteries may be bended along the dashed lines B-B, C-C, D-D, and E-E as illustrated in FIGS. 7(a) and 7(d) in such a way that the housing sections for conductive section 6 wrap around the housing section 5 for power generation element while the positive-electrode external connection section 21a and the negative-electrode external connection section 21b are placed on a same side of the housing section 5 for power generation element.

The sealed batteries may be bended along the dashed lines B-B, C-C, D-D, and E-E as illustrated in FIGS. 7(b) and 7(c) in such a way that the housing sections for conductive section 6 wrap around the housing section 5 for power generation element while the positive-electrode external connection section 21a is placed on one side of the housing section 5 for power generation element, and the negative-electrode external connection section 21b is placed on the other side of the housing section for power generation element.

Such structures may allow two sealed batteries 30 to be arranged in such a way that a larger side surface of the housing section 5 for power generation element is opposed to a larger side surface of the other housing section 5 for power generation element; and the external connection sections 21 are directly connected at the connection portion 33. These structures thus easily enable the two sealed batteries 30 to be electrically connected. The external connection sections 21 may be connected at the connection portion 33 with use of a fastener such as a bolt or a clip, by welding, by soldering, with use of a conductive tape, or with use of a conductive adhesive.

The battery may be bended along the dashed line B-B and the dashed line C-C to form a valley fold and a mountain fold, respectively, and vice versa; or the battery may be bended along the dashed line D-D and the dashed line E-E to form a valley fold and a mountain fold, respectively, and vice versa. FIG. 7(e) illustrates that the battery is bended along the dashed line D-D and the dashed line E-E to form a valley fold and a mountain fold, respectively.

Such structures may allow an assembled battery 35 to be formed in which two sealed batteries 30 are arranged in such a way that a smaller side surface of the housing section 5 for power generation element is opposed to a smaller side surface of the other housing section 5 for power generation element in order to connect the sealed batteries 30 electrically.

An assembled battery 35 may be formed by allowing two or more sealed batteries 30 having the bended portion 26 to be adjacent to each other and assembling the sealed batteries, by connecting the external connection section 21 of the sealed battery 30 with the external connection section 21 of the adjacent sealed battery 30 at the connection portion 33. The conductive section 22 is covered with the laminate film 1 to be insulated; therefore, assembled batteries 35 such as above are capable of suppressing the flow of leak current.

FIGS. 8(a) to 8(e) illustrate diagrammatic top views of assembled batteries 35, each of the assembled batteries having two or more sealed batteries 30 connected in series; and FIGS. 9(a) to 9(e) illustrate diagrammatic top views of assembled batteries 35 having a structure in which two or more sealed batteries 30 are connected in parallel or a structure in which two or more sealed batteries 30 connected in series are connected in parallel with two or more sealed batteries 30 connected in series.

The assembled batteries 35 as illustrated in FIGS. 8(a) and 8(b), each of which having the sealed batteries connected in series, or the assembled battery 35 as illustrated in FIG. 9(a) having the sealed batteries connected in parallel may be formed as follows: The sealed batteries are assembled in which the external connection sections 21 of the sealed batteries 30 are bended toward a larger side surface of the sealed batteries as illustrated in FIGS. 7(a) and 7(d); and the positive-electrode external connection section 21a of the one sealed battery is connected with the negative-electrode external connection section 21b of the adjacent sealed battery at the connection portion 33.

The assembled batteries 35 as illustrated in FIGS. 8(c) and 8(d), each of which having the sealed batteries connected in series, may be formed as follows: The sealed battery 30 bended to form a valley fold and a mountain fold as illustrated in FIG. 7(e) is arranged with the sealed battery 30 having the external connection sections 21 bended toward a larger side surface of the sealed battery 30 in such a way that a smaller side surface of the one sealed battery is opposed to a smaller side surface of the other sealed battery.

The assembled battery 35 as illustrated in FIG. 8(e) having the sealed batteries connected in series or the assembled batteries 35 as illustrated in FIGS. 9(b) and 9(c), in which the sealed batteries 30 connected in series are connected in parallel with the sealed batteries 30 connected in series, may be formed as follows: The sealed battery 30 bended to form a valley fold and a mountain fold as illustrated in FIG. 7(e) is arranged with the sealed battery 30 having the external connection sections 21 bended toward a larger side surface of the sealed battery 30.

As described above, the assembled batteries 35 in accordance with the present embodiments may be formed without having any wasted spaces.

Figure 7:
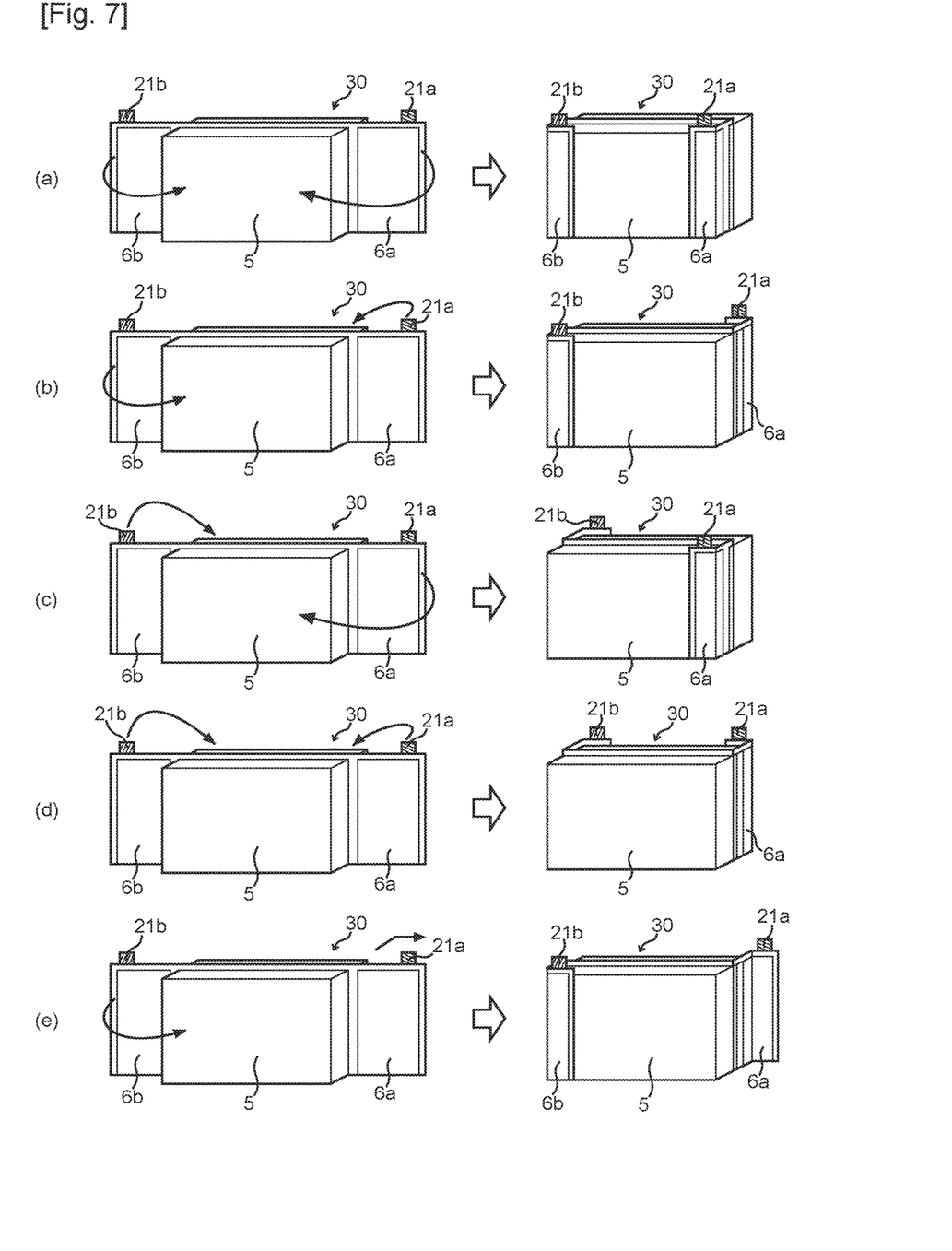
FIGS. 7(a) to 7(e) illustrate diagrammatic perspective views of sealed batteries in accordance with an embodiment of the present invention.
Figure 8:
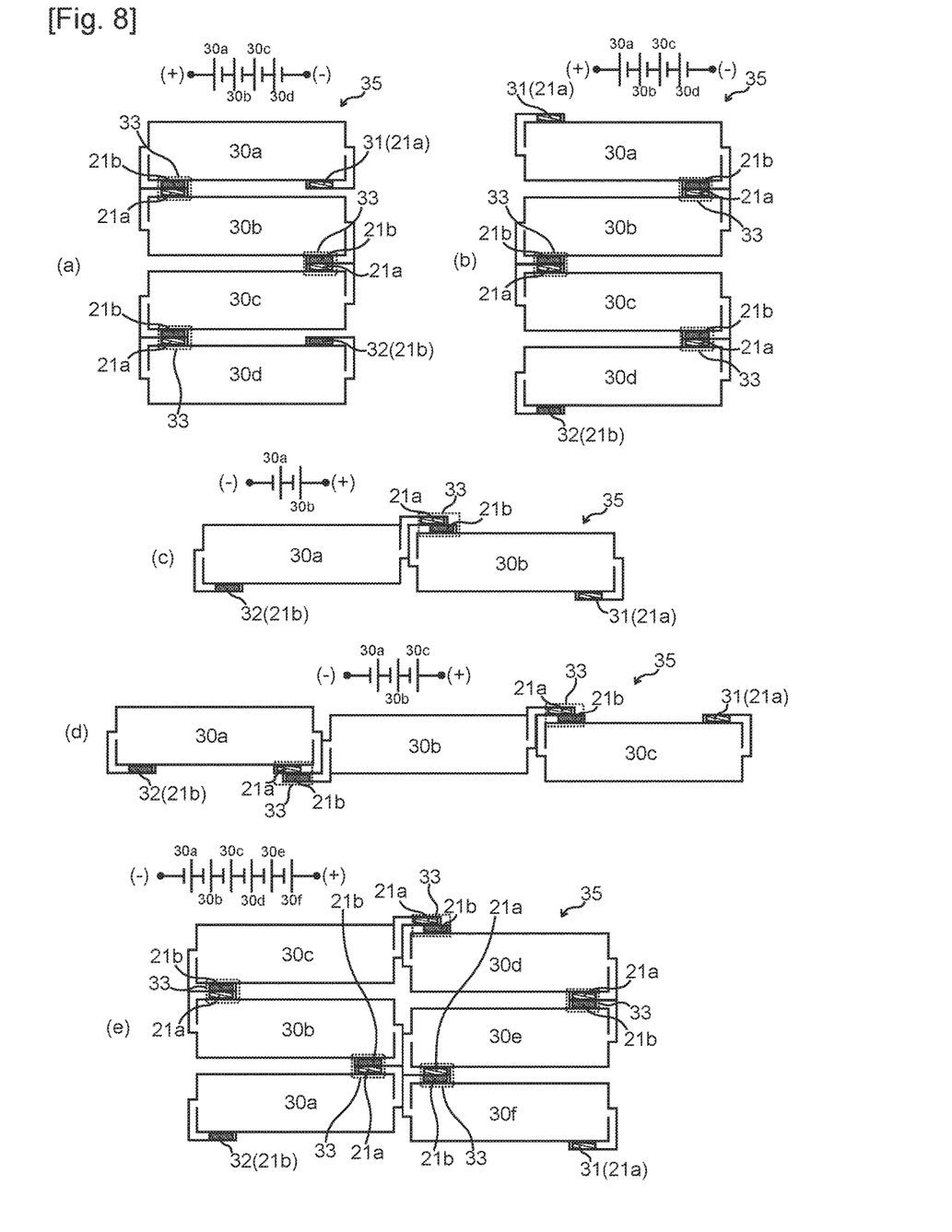
FIGS. 8(a) to 8(e) illustrate diagrammatic top views of assembled batteries in accordance with an embodiment of the present invention.
Figure 9:
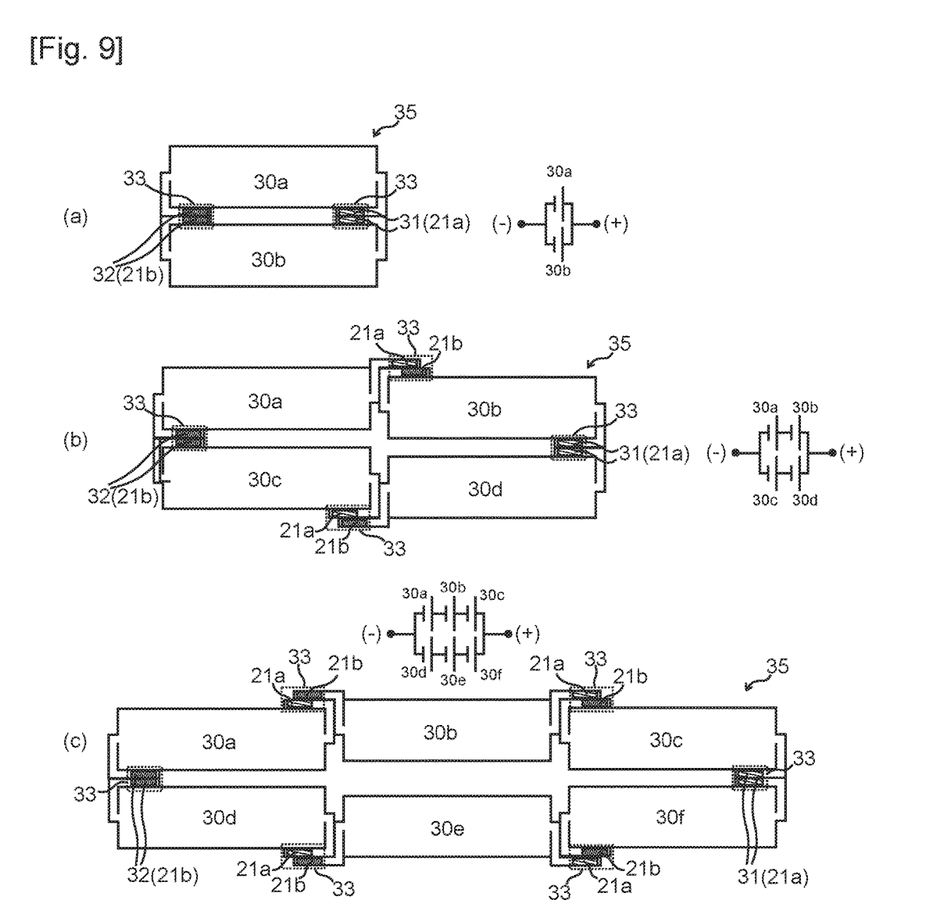
FIGS. 9(a) to 9(c) illustrate diagrammatic top views of assembled batteries in accordance with an embodiment of the present invention.

FIGS. 7 to 9 exemplify the desirable embodiments of the assembled batteries without using bus bars; however, these embodiments are not to discourage the use of a bus bar in assembled batteries.

REFERENCE SIGNS LIST

1: laminate film; 2: fusion bonding section; 3: first sealing section; 3a: first positive-electrode sealing section; 3b: first negative-electrode sealing section; 4: second sealing section; 4a: second positive-electrode sealing section; 4b: second negative-electrode sealing section; 5: housing section for power generation element; 6: housing section for conductive section; 6a: housing section for positive-electrode conductive section; 6b: housing section for negative-electrode conductive section; 10: power generation element; 11: electrode sheet; 11a: positive-electrode sheet; 11b: negative-electrode sheet; 12: positive-electrode active material layer; 13: negative-electrode active material layer; 14: positive-electrode current collector sheet; 15: negative-electrode current collector sheet; 16: separator; 20: electrode connection terminal; 20a: positive-electrode connection terminal; 20b: negative-electrode connection terminal; 21: external connection section; 21a: positive-electrode external connection section; 21b: negative-electrode external connection section; 22: conductive section; 22a: positive-electrode conductive section; 22b: negative-electrode conductive section; 23: electrode connection section; 23a: positive-electrode connection section; 23b: negative-electrode connection section; 25: electrolyte; 26: bended portion; 30, 30a, 30b, 30c, 30d, 30e, 30f: sealed battery; 31: positive electrode-side termination; 32: negative electrode-side termination; 33: connection portion; 35: assembled battery

The invention claimed is:

1. A pouch battery comprising a power generation element including an electrode sheet and a separator; a laminate film disposed in such a way as to enclose the power generation element therein; an electrode connection terminal connected to the electrode sheet; and an electrolyte, wherein the laminate film is shaped to form a first housing section for power generation element and a second housing section for conductive section, the first housing section is hermetically sealed at a fusion bonding section and at a first sealing section, the fusion bonding section is a section where parts of the laminate film are overlapped and fusion-bonded, the first sealing section is a section where the electrode connection terminal is sandwiched between and fusion-bonded with parts of the laminate film, the second housing section is separated from the first housing section by the first sealing section, the power generation element and the electrolyte are housed in the first housing section, the electrode connection terminal comprises an external connection section for connecting with external and a conductive section, the external connection section is disposed without being covered with the laminate film, and the conductive section is disposed between the external connection section and the first sealing section, and is covered with the second housing section without bonding with the laminate film.

2. The pouch battery according to claim 1, wherein the second housing section for conductive section is hermetically sealed at the fusion bonding section, the first sealing section, and a second sealing section where the electrode connection terminal is sandwiched between and bonded with parts of the laminate film;

the second sealing section is disposed between the conductive section and the external connection section; and the conductive section is housed in the second housing section for conductive section.

3. The pouch battery according to claim 1, wherein the electrode sheets comprise a positive-electrode sheet and a negative-electrode sheet;

the electrode connection terminals comprise a positive-electrode connection terminal to be connected to the positive-electrode sheet, and a negative-electrode connection terminal to be connected to the negative-electrode sheet;

the first sealing sections comprise a first positive-electrode sealing section where the positive-electrode connection terminal is sandwiched between and fusion-bonded with parts of the laminate film, and a first negative-electrode sealing section where the negative-electrode connection terminal is sandwiched between and fusion-bonded with parts of the laminate film;

the positive-electrode connection terminal comprises a positive-electrode external connection section for connecting with external, and a positive-electrode conductive section disposed between the positive-electrode external connection section and the first positive-electrode sealing section;

the negative-electrode connection terminal comprises a negative-electrode external connection section for connecting with external, and a negative-electrode conductive section disposed between the negative-electrode external connection section and the first negative-electrode sealing section; and the positive-electrode conductive section or the negative-electrode conductive section is covered with the laminate film without bonding.

4. The pouch battery according to claim 3, wherein the laminate film is shaped to form a second housing section for positive-electrode conductive section, the second housing section for positive-electrode conductive section being hermetically sealed at the fusion bonding section, the first positive-electrode sealing section, and a second positive-electrode sealing section where the positive-electrode connection terminal is sandwiched between and bonded with parts of the laminate film, and to form a second housing section for negative-electrode conductive section, the second housing section for negative-electrode conductive section being hermetically sealed at the fusion bonding section, the first negative-electrode sealing section, and a second negative-electrode sealing section where the negative-electrode connection terminal is sandwiched between and bonded with parts of the laminate film;

the second positive-electrode sealing section is disposed between the positive-electrode conductive section and the positive-electrode external connection section;

the second negative-electrode sealing section is disposed between the negative-electrode conductive section and the negative-electrode external connection section;

the positive-electrode conductive section is housed in the second housing section for positive-electrode conductive section; and the negative-electrode conductive section is housed in the second housing section for negative-electrode conductive section.

5. The pouch battery according to claim 4, wherein the first housing section for power generation element is interposed between the second housing section for positive-electrode conductive section and the second housing section for negative-electrode conductive section.

6. The pouch battery according to claim 3, wherein the positive-electrode sheet comprises a positive-electrode current collector sheet to be connected to the positive-electrode connection terminal, and a positive-electrode active material layer disposed on the positive-electrode current collector sheet;

the negative-electrode sheet comprises a negative-electrode current collector sheet to be connected to the negative-electrode connection terminal, and a negative-electrode active material layer disposed on the negative-electrode current collector sheet;

the power generation element is configured to allow the positive-electrode current collector sheet to be foldable that is located between the positive-electrode connection terminal and an area where the positive-electrode active material layer, the negative-electrode active material layer, and the separator are overlapped one another; and the power generation element is configured to allow the negative-electrode current collector sheet to be foldable that is located between the negative-electrode connection terminal and an area where the positive-electrode active material layer, the negative-electrode active material layer, and the separator are overlapped one another.

7. The pouch battery according to claim 3, wherein each of the positive-electrode connection terminal and the negative-electrode connection terminal is L-shaped.

8. The pouch battery according to claim 3, wherein the positive-electrode conductive section and the negative-electrode conductive section each has a bended portion.

9. The pouch battery according to claim 4, wherein the positive-electrode sheet comprises a positive-electrode current collector sheet to be connected to the positive-electrode connection terminal, and a positive-electrode active material layer disposed on the positive-electrode current collector sheet;

the negative-electrode sheet comprises a negative-electrode current collector sheet to be connected to the negative-electrode connection terminal, and a negative-electrode active material layer disposed on the negative-electrode current collector sheet;

the power generation element is configured to allow the positive-electrode current collector sheet to be foldable that is located between the positive-electrode connection terminal and an area where the positive-electrode active material layer, the negative-electrode active material layer, and the separator are overlapped one another; and the power generation element is configured to allow the negative-electrode current collector sheet to be foldable that is located between the negative-electrode connection terminal and an area where the positive-electrode active material layer, the negative-electrode active material layer, and the separator are overlapped one another.

10. The pouch battery according to claim 4, wherein each of the positive-electrode connection terminal and the negative-electrode connection terminal is L-shaped.

11. The pouch battery according to claim 9, wherein each of the positive-electrode connection terminal and the negative-electrode connection terminal is L-shaped.

12. The pouch battery according to claim 4, wherein the positive-electrode conductive section and the negative-electrode conductive section each has a bended portion.

13. The pouch battery according to claim 6, wherein the positive-electrode conductive section and the negative-electrode conductive section each has a bended portion.

14. The pouch battery according to claim 9, wherein the positive-electrode conductive section and the negative-electrode conductive section each has a bended portion.

15. The pouch battery according to claim 6, wherein
each of the positive-electrode connection terminal and the negative-electrode connection terminal is L-shaped; and
the positive-electrode conductive section and the negative-electrode conductive section each has a bended portion.

16. The pouch battery according to claim 11, wherein the positive-electrode conductive section and the negative-electrode conductive section each has a bended portion.

17. An assembled battery comprising the two or more pouch batteries according to claim 13 wherein the external connection section of the pouch battery is connected to the external connection section of the adjacent pouch battery.

18. An assembled battery comprising the two or more pouch batteries according to claim 14 wherein the external connection section of the pouch battery is connected to the external connection section of the adjacent pouch battery.

19. An assembled battery comprising the two or more pouch batteries according to claim 16 wherein the external connection section of the pouch battery is connected to the external connection section of the adjacent pouch battery.

20. An assembled battery comprising the two or more pouch batteries according to claim 5 wherein
the external connection section of the pouch battery is connected to the external connection section of the adjacent pouch battery;
the positive-electrode sheet comprises a positive-electrode current collector sheet to be connected to the positive-electrode connection terminal, and a positive-electrode active material layer disposed on the positive-electrode current collector sheet;
the negative-electrode sheet comprises a negative-electrode current collector sheet to be connected to the negative-electrode connection terminal, and a negative-electrode active material layer disposed on the negative-electrode current collector sheet;
the power generation element is configured to allow the positive-electrode current collector sheet to be foldable that is located between the positive-electrode connection terminal and an area where the positive-electrode active material layer, the negative-electrode active material layer, and the separator are overlapped one another;
the power generation element is configured to allow the negative-electrode current collector sheet to be foldable that is located between the negative-electrode connection terminal and an area where the positive-electrode active material layer, the negative-electrode active material layer, and the separator are overlapped one another;
each of the positive-electrode connection terminal and the negative-electrode connection terminal is L-shaped; and
the positive-electrode conductive section and the negative-electrode conductive section each has a bended portion.

* * * * *